United States Patent Office 2,719,794
Patented Oct. 4, 1955

2,719,794
SHOE IMPREGNITES

Harold P. Averill, Aberdeen, Md., Ralph W. Peakes, Washington, D. C., and Frank Carl Whitney, Edgewood Arsenal, and Herbert A. Scruton, Baltimore, Md., assignors to the United States of America, in trust, as represented by the Secretary of War No Drawing. Application July 21, 1942,
Serial No. 451,810

7 Claims. (Cl. 106—229)

(Granted under Title 35, U. S. Code (1952), sec. 266)

The invention described herein may be manufactured and used by or for the Government for governmental purposes, without the payment to us of any royalty thereon.

This invention relates generally to compositions of matter to be used as leather impregnites, and particularly as shoe impregnites, for rendering leather, and particularly shoes, resistant to penetration by chemical warfare vesicant agents such as mustard gas, Lewisite, and the like.

Mustard gas and Lewisite are persistent vesicant agents which remain in liquid form for long periods of time. These and like vesicants are capable of penetrating shoe leather so as to cause severe blistering of the feet within short periods of time. Accordingly, it is necessary that troops required to pass over areas contaminated with such vesicants be equipped with shoes which have been suitably treated so as to give protection against these agents.

The object of this invention, generally stated, is to provide impregnites in large quantities made from inexpensive, readily available materials, which may be used to treat leather, particularly shoe leather, so as to render the same resistant to penetration by mustard gas, Lewisite, and like vesicants, for substantial periods of time. Certain impregnites of the invention are adapted to be used without heating for field impregnation of shoes, while other impregnites of the invention require gentle heating to maintain them in a molten condition for impregnating purposes.

For a more complete understanding of the nature and scope of this invention reference may be had to the following detailed description thereof setting forth, as illustrative, certain novel impregnite compositions and certain novel techniques of compounding the same.

In general, the impregnite compositions of the invention comprise a wax, a gum, and an oil. Compositions of this type generally require gentle heating to melt them so that they may be used to treat shoes or other leather articles. In the field it is objectionable and often impracticable to heat and melt the impregnites. Accordingly, where the impregnite compositions are to be issued to field forces, a volatile solvent may be included as an ingredient so as to provide an easy flowing, paste type, of material which can be applied to the shoes and leather in the field without heating.

As examples of waxes that may be used in the impregnite compositions there may be mentioned, paraffin, beeswax, stearic acid, carnauba wax, candelilla wax, lanoline, "Carbowax" (a water soluble wax made by polymerizing ethylene oxide and then introducing a hydroxyl group on each end of the long chain polymerization product by treatment with water), "Opal Wax" (a synthetic wax comprised principally of 12-hydroxy stearin produced by the catalytic hydrogenation of castor oil), and "Glyco Wax B" (a polyhydric alcohol ester of the higher fatty acids).

As examples of gums that may be used in the impregnite compositions, there may be listed, ester gum, "Amberol" (a synthetic resin made by condensing phenol and formaldehyde and adding rosin to the condensation product to produce an oil soluble material), "Bakelite Resin" (a 100% phenolic resin made by the condensation of either phenol or one of its derivatives and formaldehyde), and an alkyd resin commercially known as "Paraplex B."

Examples of oils that may be used in the impregnite compositions are, neat's-foot oil, castor oil, and linseed oil.

Of the various waxes that may be used, paraffin wax has been found to be very satisfactory. Particularly, a paraffin wax which comprises a mixture of the crystalline and amorphous forms of this substance. These two forms or varieties of paraffin may be used in the proportions of from 50 to 75% of the crystalline form and from 25 to 50% of the amorphous or micro-crystalline form.

Of the various gums that may be used in the impregnite compositions, ester gum has been found to be particularly satisfactory since it has a high resistance to penetration by mustard gas, Lewisite and like vesicants. Furthermore, of the various combinations of waxes and gums that may be used together, a mixture of ester gum and paraffin wax provides a peculiarly and unusually desirable combination. These two normally solid materials, when worked together form a mass which is very pliable at ordinary temperatures.

Neat's-foot oil has been found to serve satisfactorily as the oil constituent in the impregnite compositions. However, it will be understood that other oils may be substituted depending upon their availability.

It has been found that it is desirable to employ the wax, gum and oil constituents of the impregnite compositions in the proportions of about two parts by weight of wax, about two parts by weight of gum, and about one part by weight of oil. Shoe impregnites having excellent properties may be made having the following composition:

| Component: | Parts by weight |
| --- | --- |
| Ester gum | 40 |
| Neat's-foot oil | 20 |
| Crystalline paraffin wax | 20–30 |
| Amorphous paraffin wax | 10–20 |

In preparation of a one hundred pound batch of impregnite according to the above formula, forty pounds of lump or freshly crushed ester gum and twenty pounds of neat's-foot oil are placed in a twenty gallon kettle equipped with a mechanical stirring device. The gum and oil are heated and worked together with stirring for one to two hours at a temperature within the range of from about 220° to 300° C. The heating is then stopped and forty pounds of mixed paraffin wax (for example twenty pounds of crystalline paraffin wax and twenty pounds of amorphous paraffin wax) are added in small lumps with stirring until a homogeneous impregnite composition is obtained.

The impregnite composition obtained will be solid at ordinary temperatures, and to be applied to shoes or leather the same must be heated until molten. The technique of application involves either immersing shoes or leather goods in a molten bath of the impregnite, or, alternatively, the shoes or leather goods may be warmed and the molten impregnite rubbed on the articles with hand pads or brushes. Certain other techniques of application and variations are available.

Under field conditions, as stated above, it may often be inconvenient, and often, impractical, to heat the impregnite compositions. This added requirement that an impregnite composition be provided for field use which does not necessitate heating for application has been satisfactorily met by incorporating a suitable volatile solvent as a constituent of the composition. Solvents that may be used are solvent naphtha boiling between 300° and 400° C. and known in the trade as Stoddard solvent or Cleaner's solvent, carbon tetrachloride, trichlorethylene, ethylene dichloride, and the like. Of these various solvents Stoddard solvent or solvent naphtha has been found to be very satisfactory as the solvent constituent. An impregnite composition, including solvent naphtha as a constituent thereof and having the following composition, has been prepared and satisfactorily tested:

| Component: | Parts by weight |
|---|---|
| Ester gum | 15 |
| Neat's-foot oil | 30 |
| Crystalline paraffin wax | 15 |
| Amorphous paraffin wax | 15 |
| Stoddard solvent | 25 |

In one method of preparing impregnite according to the above formula, the neat's-foot oil is heated above 100° C., the ester gum is added to the hot oil with stirring, and the temperature of the mixture is raised to 220° to 300° C. and maintained for an hour or more. The heating is then stopped and the amorphous paraffin wax is added. Next, the crystalline paraffin wax is added and the mixture is allowed to cool to a temperature of approximately 120° C., at which temperature the Stoddard solvent is added and the batch allowed to cool. During the compounding the mixture is preferably stirred continuously until the composition has cooled to about 20 to 27° C. The impregnite composition obtained has a consistency comparable to that of shaving cream or tooth paste which permits it to be easily worked by hand into shoes and leather goods at ordinary temperatures without heating. The solvent permits the impregnite to be worked well into the leather and the excess thereof readily evaporates therefrom. The impregnite paste may be packed in cans or collapsible tubes for issue to field troops.

Extended tests have shown that when shoes are treated with the various impregnite compositions of the invention they are capable of effectively resisting penetration by mustard gas, Lewisite, and like vesicants for about twenty hours. The value of the impregnite compositions is obvious when it is realized that untreated shoes will resist the vesicant agents for from only one-half an hour to one and one-half hours. Furthermore, the impregnite compositions do not adversely affect the wearing life of the shoes and troops do not notice any discomfort or irritation on wearing the impregnated shoes.

Since certain changes and modifications may be made in the foregoing compositions and techniques of compounding the same without departing from the scope of this invention, it is intended that all matter contained in the above description shall be interpreted as illustrative and not in a limited sense.

We claim:

1. A composition of matter for treatment of leather to render it resistant to penetration by mustard gas, Lewisite and like vesicants which comprises about 40 parts by weight of paraffin, about 40 parts by weight of ester gum, and about 20 parts by weight of neat's-foot oil.

2. A composition of matter for treatment of leather to render it resistant to penetration by mustard gas, Lewisite and like vesicants, which comprises about 40 parts by weight of paraffin wax, about 40 parts by weight of ester gum, and about 20 parts by weight of neat's-foot oil, said 40 parts of paraffin wax comprising from 50% to 75% by weight of crystalline paraffin wax and from 25% to 50% by weight of amorphous or microcrystalline paraffin wax.

3. A composition of matter for treatment of leather at ordinary temperatures to render it resistant to penetration by mustard gas, Lewisite, and like vesicants which comprises a solvent naphtha boiling between 300° and 400° F. and intimately distributed therein a mixture of paraffin wax, ester gum, and neat's-foot oil in the ratio of about 2 parts by weight of the paraffin wax, about 2 parts by weight of the ester gum, and about 1 part by weight of the neat's-foot oil.

4. A composition of matter for treatment of leather at ordinary temperatures to render it resistant to penetration by mustard gas, Lewisite, and like vesicants, which comprises a solvent naphtha boiling between 300° and 400° F. and intimately distributed therein a mixture of paraffin wax, ester gum, and neat's-foot oil in the ratio of about 2 parts by weight of the paraffin, about 2 parts by weight of the ester gum, and about 1 part by weight of the neat's-foot oil, said paraffin wax component containing from about 50% to 75% by weight of crystalline paraffin wax and from about 25% to 50% by weight of amorphous to microcrystalline paraffin wax.

5. A composition of matter for treatment of leather at ordinary temperatures to render it resistant to penetration by mustard gas, Lewisite, and like vesicants, which comprises about 20% by weight of solvent naphtha boiling between 300° and 400° C., about 16% by weight of amorphous paraffin wax, about 16% by weight of crystalline paraffin wax, about 32% by weight of ester gum, and about 16% by weight of neat's-foot oil.

6. A composition of matter for treatment of leather at ordinary temperatures to render it resistant to penetration by mustard gas, Lewisite, and like vesicants, which comprises about 25% by weight of solvent naphtha boiling between 300° and 400° F., about 15% by weight of amorphous paraffin wax, about 15% by weight of crystalline paraffin wax, about 30% by weight of ester gum, and about 15% by weight of neat's-foot oil.

7. The method of preparing a composition which penetrates into the body of the leather of a shoe for the protection of the shoe against the penetration therethrough of mustard gas, Lewisite, and like vesicants, which comprises, heating neat's-foot oil to at least 100° C., adding ester gum to the hot oil, raising the temperature of the oil-gum mixture to within the range of 220° to 300° C., maintaining the elevated temperature for at least an hour, discontinuing the heating and adding amorphous paraffin wax, then adding crystalline paraffin wax and allowing the resulting mixture to cool to approximately 120° C. at about which temperature solvent naphtha boiling between 300° and 400° C. is added, and stirring the mixture continuously until it has cooled to about 20° to 27° C.

References Cited in the file of this patent

UNITED STATES PATENTS

| 216,596 | Brown | June 17, 1879 |
| 1,609,798 | Danielson | Dec. 7, 1926 |
| 2,004,781 | Clark | June 11, 1935 |
| 2,118,308 | Jaeger | May 24, 1938 |
| 2,122,543 | Tomsicek | July 5, 1938 |
| 2,261,091 | Maquire | Oct. 28, 1941 |
| 2,271,492 | Bryce | Jan. 27, 1942 |
| 2,374,617 | Pearsall | Apr. 24, 1945 |

OTHER REFERENCES

Chemistry of Leather Manufacture, 2nd edition, vol. II, Wilson-Chemical Catalog, 1929, pages 907 and 917.